US009680751B2

(12) United States Patent
Janakiraman et al.

(10) Patent No.: US 9,680,751 B2
(45) Date of Patent: *Jun. 13, 2017

(54) METHODS AND DEVICES FOR PROVIDING SERVICE INSERTION IN A TRILL NETWORK

(71) Applicant: Cisco Technology, Inc., San Jose, CA (US)

(72) Inventors: Rajagopalan Janakiraman, Cupertino, CA (US); Pags Krishnamoorthy, San Jose, CA (US); Sridhar Subramanian, San Jose, CA (US); Venkataraman Natham, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/709,125

(22) Filed: May 11, 2015

(65) Prior Publication Data

US 2015/0326478 A1 Nov. 12, 2015

Related U.S. Application Data

(63) Continuation of application No. 13/793,148, filed on Mar. 11, 2013, now Pat. No. 9,049,127.

(51) Int. Cl.
*H04L 12/801* (2013.01)
*H04L 12/721* (2013.01)
(Continued)

(52) U.S. Cl.
CPC ............ *H04L 47/10* (2013.01); *H04L 45/38* (2013.01); *H04L 45/66* (2013.01); *H04L 47/125* (2013.01); *H04L 67/1023* (2013.01)

(58) Field of Classification Search
None
See application file for complete search history.

(56) References Cited

U.S. PATENT DOCUMENTS 8,295,284 B1   10/2012   Singh et al.
9,049,127 B2 *  6/2015   Janakiraman ........... H04L 47/10
(Continued)

OTHER PUBLICATIONS

Perlman, R. et al., "RBridges: Base Protocol Specification," Internet draft, <draft-ietf-trill-rbridge-protocol-16.txt>, TRILL Working Group, Mar. 3, 2010, 118 pages.

*Primary Examiner* — Donald Mills
(74) *Attorney, Agent, or Firm* — Meunier Carlin & Curfman LLC

(57) ABSTRACT

The methods and devices discussed herein provide service clustering within a TRILL network without relying on an additional service insertion framework. A TRILL network can include one or more flow distribution RBridges for distributing flows to service nodes. Each flow distribution RBridge can have a virtual base identifier and one or more virtual cluster identifiers. An example method can include maintaining service cluster load balancing structures and receiving a packet that is encapsulated with an inner header and an outer header. The method can include determining whether the egress RBridge identifier is a virtual cluster identifier, and if so, selecting a service node from one of the service cluster load balancing structures. The method can include forwarding the packet to the selected service node.

16 Claims, 4 Drawing Sheets

(51) Int. Cl.
*H04L 12/803* (2013.01)
*H04L 29/08* (2006.01)

(56) References Cited

U.S. PATENT DOCUMENTS

| | | |
|---|---|---|
| 2011/0268125 A1 | 11/2011 | Vobbilisetty et al. |
| 2012/0177039 A1 | 7/2012 | Berman |
| 2012/0243539 A1 | 9/2012 | Keesara |
| 2014/0029412 A1* | 1/2014 | Janardhanan ........... H04L 45/66 370/221 |
| 2014/0029423 A1 | 1/2014 | Badhani et al. |

* cited by examiner

METHODS AND DEVICES FOR PROVIDING SERVICE INSERTION IN A TRILL NETWORK

CROSS REFERENCE TO RELATED APPLICATION

This application is a continuation of U.S. application Ser. No. 13/793,148, filed Mar. 11, 2013, entitled, "METHODS AND DEVICES FOR PROVIDING SERVICE CLUSTERING IN A TRILL NETWORK," which is incorporated herein by reference in its entirety.

BACKGROUND

Transparent Interconnect of Lots of Links (TRILL) is an IETF standard implemented in RBridges. TRILL provides an architecture of Layer 2 control and forwarding that enjoys major benefits such as pair-wise optimal forwarding, loop mitigation, multipathing and provisioning tree. TRILL supports incremental deployment and interoperation with classical Ethernet (CE) through mechanisms such as adjacencies over shared media, designated RBridge (DRB) election and appointed forwarder (AF) assignment. RBridges on a network run a link state protocol such as Intermediate System-to-Intermediate System (IS-IS), for example, to broadcast connectivity to other RBridges on the network. Using the link state protocol, the RBridges determine connectivity between the RBridges. For example, the RBridges obtain information needed to calculate pair-wise optimal paths for unicast and/or distribution trees for multicast/broadcast using the link state protocol.

Providing service insertion and clustering in a TRILL network has a number of challenges. For example, automatic discovery of service nodes in a TRILL network can present challenges. Additionally, upon inserting a new service node into a service cluster, existing traffic flows should not be disrupted by redistribution of load-balancing hash values. In particular, a reverse flow should be serviced by the same service node(s) that serviced the forward flow. This is referred to as "stickiness."

Providing a control plane for implementing service insertion, clustering and chaining can also present challenges. A service cluster can include multiple service types that are processed sequentially in a service chain, and each of the service types can be hosted on one or more service nodes for load-sharing. A TRILL network can include a plurality of service clusters, and each service node can belong to one or more of the service clusters. The control plane should direct new traffic flows dynamically to service node(s) based on current usage of the service nodes in the service cluster for efficient use of the capacity of the service cluster. Accordingly, providing a control plane adds another layer of complexity. Additionally, providing a flexible, scalable solution for any topology of client-facing packet-forwarding devices, server-facing packet-forwarding devices and service appliances by leveraging the combined resources within a TRILL network presents challenges. For example, provisioning on-demand service clusters by leveraging combined resources of a TRILL network (e.g., integrated services modules, connected service appliances, etc.) in the TRILL network without the overhead of management complexity, which typically involves globally administered VLAN switching configurations in packet-forwarding devices, service modules on a per chassis basis and associated service appliances, can be challenging. This may be of paramount importance in enterprise campus and data center deployments, where a basic challenge is that each packet-forwarding device has no notion of the available service types or the total service bandwidth in the TRILL network.

SUMMARY

The methods and devices discussed herein can provide service clustering functionality within a TRILL network without relying on a service insertion framework in addition to the TRILL network. Optionally, the methods and devices discussed herein can provide service insertion functionality. Additionally, the methods and devices discussed herein can also optionally provide service chaining functionality. The TRILL network can include one or more flow distribution RBridges for distributing flows to a plurality of service nodes. Each flow distribution RBridge can have a virtual base identifier and one or more virtual cluster identifiers. An example method for providing service clustering in a TRILL network can include maintaining N service cluster load balancing structures in a flow distribution RBridge (N being a number of service clusters and N≥1) and receiving a packet. The packet can be encapsulated with an inner header and an outer header, where the inner header includes a source address and a destination address of a flow, and the outer header includes an ingress RBridge identifier for one of the flow distribution RBridges in the TRILL network and an egress RBridge identifier for one of the flow distribution RBridges in the TRILL network. The method can also include determining whether the egress RBridge identifier is a virtual cluster identifier or a virtual base identifier, and if the egress RBridge identifier is a virtual cluster identifier, applying a hash function to a predetermined flow tuple to obtain a hash value and selecting a service node associated with the hash value from one of the N service cluster load balancing structures. The method can further include forwarding the packet to the selected service node.

Additionally, if the egress RBridge identifier is a virtual base identifier, the method can optionally include regular RBridge forwarding. For example, the packet can be forwarded based on at least a portion of the inner header such as the destination address (e.g., a destination MAC address).

Optionally, the method can include maintaining flow-state information in a flow-state table, learning the predetermined flow tuple for a reverse flow and determining whether the packet is part of an existing flow. If the packet is part of an existing flow, the method can include performing a lookup in the flow-state table to obtain a next hop and forwarding the packet based on a result of the lookup. If the packet is not part of an existing flow, the method can include determining whether the egress RBridge identifier is a virtual cluster identifier or a virtual base identifier.

In addition, the method can include decapsulating the outer header from the received packet and encapsulating the packet with a new outer header. The new outer header can include a new ingress RBridge identifier and a new egress RBridge identifier. For example, the new ingress RBridge identifier can be the egress RBridge identifier (e.g., the egress RBridge identifier of the packet before decapsulation), and the new egress RBridge identifier can be a virtual identifier of the selected service node.

Optionally, the method can include receiving a services Type Length Value (TLV). The services TLV can include at least one of a service cluster identifier, a service type, a service load metric and a service sequence number. The method can also include updating one or more of the N service cluster load balancing structures based on the services TLV. For example, the services TLV can be an IS-IS TLV.

Optionally, the method can include maintaining a plurality of flow distribution load balancing structures in the flow distribution RBridge.

Additionally, the method can optionally include transmitting or receiving a flow distribution TLV. The flow distribution TLV can include the hash function and a plurality of hash values, a flow distribution base RBridge associated with each of the hash values and a flow distribution RBridge associated with each combination of cluster identifier and hash value. The method can also include updating one or more of the plurality of flow distribution load balancing structures based on the flow distribution TLV. For example, the flow distribution TLV can be an IS-IS TLV.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. While implementations will be described for providing service clustering in a TRILL network, it will become evident to those skilled in the art that the implementations are not limited thereto, but are applicable for providing service clustering in other networks employing Layer 3 routing techniques within a Layer 2 network environment. For example, the techniques disclosed herein can be implemented with other protocols, either standardized or proprietary, including but not limited to FABRICPATH of CISCO SYSTEMS, INC., SAN JOSE, Calif.

The methods and devices discussed herein can provide service clustering functionality within a TRILL network without relying on a service insertion framework in addition to the TRILL network. Optionally, the methods and devices discussed herein can provide service insertion functionality. Additionally, the methods and devices discussed herein can also optionally provide service chaining functionality. The methods and devices discussed herein can provide service clustering functionality by defining flow distribution RBridges within the TRILL network for distributing traffic flows to a plurality of service nodes. In addition, the service clustering and chaining functionality can be implemented using TLVs, such as, but not limited to, IS-IS TLVs. For example, the methods and devices discussed herein can use a header (e.g., a TRILL header) and options of the TLVs to provide all of the control plane and data plane functionalities that would typically be provided by a service insertion framework. Using IS-IS TLVs, it is therefore possible to integrate service clustering and chaining functionality as part of the TRILL data and control paths. Additionally, it is possible to leverage the existing capabilities of the TRILL network for multipathing, redundancy, auto discovery, effective resource sharing, etc.

Figure 1:
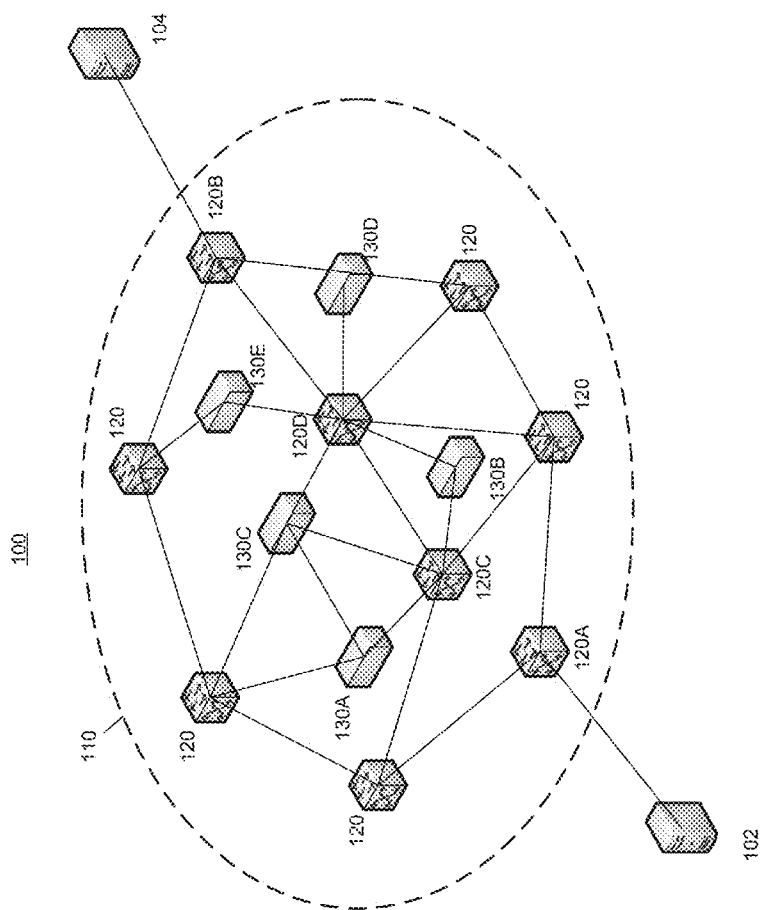
FIG. 1 is a block diagram of an example networking environment for implementing service insertion, clustering and/or chaining.

Referring now to FIG. 1, a block diagram of an example networking environment 100 for implementing service insertion, clustering and chaining is shown. It should be understood that the networking environment 100 is only provided as an example networking environment and that one of ordinary skill may provide the functionalities discussed herein in a networking environment having more or less features than shown in FIG. 1. The networking environment 100 includes a client 102, a server 104 and a TRILL network 110. The client 102 and the server 104 are communicatively connected through the TRILL network 110. The TRILL network 110 includes RBridges 120 (including 120A-120D) and service nodes 130A-130E. As discussed herein, RBridges 120 are packet-forwarding devices (e.g., switches, bridges, etc.) that are configured to implement the TRILL protocol. The TRILL protocol is discussed in "RBridges: Base Protocol Specification," available at http://tools.iettorg/html/draft-ietf-trill-rbridge-protocol-16, which is incorporated herein by reference.

As shown in FIG. 1, the client 102 and the server 104 are not part of the TRILL network 110 and therefore optionally not configured to implement the TRILL protocol. In other words, the client 102 and the server 104 are end stations relative to the TRILL network 110. Additionally, RBridge 120A is a client-facing RBridge (i.e., ingress/egress RBridge with respect to the client 102), and RBridge 120B is a server-facing RBridge (i.e., ingress/egress RBridge with respect to the server 104). The client 102 and the server 104 can be any type of computing device such as a mainframe, desktop, laptop, tablet or portable computing device, for example. Alternatively or additionally, the client 102 and the server 104 can be any type of networking device such as a switch, hub, router, gateway, etc. It should be understood that the client 102, the server 104, the RBridges 120 and the service nodes 130A-130E can be coupled to one or more nodes through one or more communication links. The communication links shown in FIG. 1 are provided only as examples, and therefore, this disclosure is not intended to be limited to the configuration shown in FIG. 1. This disclosure contemplates that the communication links are any suitable communication link. For example, a communication link may be implemented by any medium that facilitates data exchange between nodes including, but not limited to, wired, wireless and optical links.

Service Nodes

As discussed herein, a service node (e.g., service nodes 130A-130E) can be a computing device configured to perform packet manipulations beyond conventional packet forwarding. For example, a service node can perform optional packet manipulations in a communication network. A service node can perform services including, but not limited to, encryption, decryption, firewall, load balancing, intrusion detection, accounting, etc. As discussed above, this disclosure contemplates providing service clustering, and optionally service insertion and chaining, functionalities. Thus, the networking environment 100 can include N service clusters, or groups of service nodes, that perform one or more services, where N≥1. Each of the N service clusters can be identified by a cluster identifier ("cluster ID"). In FIG. 1, a single service cluster including service nodes 130A-130E is provided only as an example, and therefore, this disclosure contemplates a TRILL network including one or more service cluster, each service clustering including one or more services nodes.

Service nodes can advertise themselves as virtual RBridges to the TRILL network 110. This provides flexibility by allowing service nodes to be inserted anywhere in the TRILL network 110. For example, a service node can use a unique virtual RBridge identifier (or nickname) for each cluster it is part of. Each service node in a service cluster can use the same VIP and MAC address. The unique virtual RBridge identifier can be used in the data plane for traffic addressed to a service node in a given service cluster.

As discussed above, each of the N service clusters can be identified by a cluster ID, which is used to create groups (i.e., load balance structures) of different service nodes that are part of the same service cluster. Additionally, each service node can advertise its service properties to the TRILL network 110 using a services TLV. A services TLV can be an IS-IS TLV, for example. An example services TLV can optionally include one or more of the following properties:

1. Cluster ID
2. Service Type
3. Load Metric
4. Sequence Number

The Cluster ID identifies one of the N service clusters and is discussed above. It should be understood that a service node can advertise its service properties for each service cluster it is part of. Service Type indicates the type of service provided by a service node including, but not limited to, encryption, decryption, firewall, load balancing, intrusion detection, accounting, etc. Load Metric indicates load on a service node and can optionally be based on a number of connections, bandwidth of a service node, etc. for example. Sequence Number is the sequence number of a service type in a service cluster.

A services TLV can be transmitted by a service node at periodic intervals. It should be understood that one or more of the service properties of a service node can be dynamic in nature. For example, service load is dynamic because it may change over time. By transmitting a services TLV at periodic intervals, a service node keeps the other nodes in the TRILL network 110 informed of its service properties. For example, when a service node is running out of capacity, it can send an ad hoc message with the Load Metric of the services TLV set to zero so that subsequent new flows will not be directed to the service node. Services TLVs can be used when forming consistent cluster information (e.g., service cluster load balancing structures) throughout the TRILL network 110. For example, service cluster load balancing structures LB_SERVICES_<Cluster ID> can be formed for each service cluster. As discussed below, flow distribution RBridges can use service cluster load balancing structures LB_SERVICES_<Cluster ID> to distribute new flows a service node in a given service cluster.

Flow Distribution RBridges

One or more of the RBridges such as RBridges 120C-120D, for example, can be configured as flow distribution RBridges. In addition to conventional RBridge functionality, a flow distribution RBridge can be configured to distribute traffic flows to service nodes in the N service clusters and to provide reverse-flow stickiness (e.g., direct forward and reverse traffic flows to the same service node). A packet-forwarding device that that has NetFlow resources and supports flow-based redirection functionality can act as a flow distribution RBridge. Similar to a service node, a flow distribution RBridge can advertise one or more virtual RBridge identifiers. This provides flexibility by allowing flow distribution RBridges and/or service nodes to be inserted anywhere in the TRILL network 110. For example, an RBridge (e.g., a physical RBridge that hosts a flow distribution RBridge) can advertise reachability through a range of virtual nicknames. The virtual nicknames can include a virtual base identifier FD_BASE and a virtual cluster identifier FD_CLUSTER<Cluster ID> for each of one or more of the N service clusters. The range of virtual nicknames for a flow distribution RBridge can be defined as {FD_BASE, FD_CLUSTER_1, . . . , FD_CLUSTER_N}.

Flow distribution load balancing structures (e.g., LB_FD_BASE, LB_FD_CLUSTER_<Cluster ID>) can be maintained for use by RBridges in the TRILL network 110. For example, client-facing and server-facing RBridges such as RBridges 120A and 120B, respectively, can use the flow distribution load balancing structures when redirecting traffic flows to a flow distribution RBridge. In addition, one of the flow distribution RBridges (e.g., flow distribution RBridges 120C-120D, for example) in the TRILL network 110 can be a designated flow distribution RBridge. The designated flow distribution RBridge can be configured to listen for flow distribution RBridge events. For example, when a flow distribution RBridge comes up/goes down, it can send a message using the IS-IS protocol, for example, to a multicast group including the plurality of flow distribution RBridges (e.g., multicast group ALL_FLOW_RBRIDGES, for example). The designated flow distribution RBridge can be configured to compute run-time load of the plurality of flow distribution RBridges in response to flow distribution RBridge events. Hash values serviced by each of the flow distribution RBridges can be assigned/re-assigned by the designated flow distribution RBridge based on the computed run-time load of the plurality of flow distribution RBridges. When re-assigning hash values, the designated flow distribution RBridge can send a message to one or more affected flow distribution RBridges to copy flow-state information to another flow distribution RBridge and await confirmation from the one or more affected flow distribution RBridges. After copying flow-state information, the one or more affected RBridges can send a confirmation message to the designated flow distribution RBridge. Then, the designated flow distribution RBridge can send flow distribution load balancing information to the TRILL network 110 using a flow distribution TLV such as flow distribution IS-IS TLV, for example. A flow distribution TLV (i.e., FLOW_DISTRIBUTION_TLV) can optionally include one or more of the following:

1. A Hash Algorithm (e.g., an enumerator to indicate the predetermined flow tuple to which the hash function is applied)
2. A Number of Hash Values
3. For each of the Hash Values:
   a. Flow Distribution Base RBridge (FD_BASE_<Hash Value>)
   b. Backup Flow Distribution Base RBridge (BACKUP_FD_BASE_<Hash Value>)
   c. Number of Clusters (N)
   d. For each Cluster ID:
      i. Flow Distribution RBridge for each Cluster ID and Hash Value combination (FD_CLUSTER_<Cluster ID>_<Hash Value>)

The predetermined flow tuple can be a 5-tuple of Layer 2 Source address, Layer 2 Destination address, Layer 3 protocol type, Layer 3 source address and Layer 3 destination address, for example. Alternatively or additionally, the predetermined flow tuple can include any predetermined combination of fields. Using the flow distribution TLV, flow distribution load balancing structures (e.g., LB_FD_BASE, LB_FD_CLUSTER_1, . . . LB_FD_CLUSTER_N) can be built and maintained by the plurality of RBridges in the TRILL network 110.

In particular, the flow distribution load balancing structures (e.g., LB_FD_BASE, LB_FD_CLUSTER_1, . . . LB_FD_CLUSTER_N) can be used by the RBridges in the TRILL network 110 to direct traffic flows. For example, using an access control list (ACL), client-facing RBridges can determine to which one of the N service clusters to send a new traffic flow based on client information including, but not limited to, the client MAC address, client VLAN, etc. For example, a client-facing RBridge can select a Cluster ID based on the client information using the ACL and then use one of the flow distribution load balancing structures LB_FD_CLUSTER_<Hash Value> to select a flow distribution RBridge. Additionally, server-facing RBridges and service nodes can use flow distribution load balancing structure LB_FD_BASE to direct traffic flows received on server-facing RBridges or traffic flows leaving service node VLANs, respectively. It should be understood that a packet-forwarding device to which a service node is attached can perform the above functions if the service node lacks the above capabilities.

According to the TRILL protocol, when an RBridge (e.g., an ingress RBridge) receives traffic (e.g., one or more packets, frames, etc.) from an end station, the RBridge encapsulates the traffic with an outer header such as a TRILL header, for example. The traffic received by the ingress RBridge can be a packet encapsulated with an inner header including source and destination addresses for a flow. For example, the RBridge can receive an Ethernet frame including an inner header with source and destination MAC addresses and the packet. The outer header can include an ingress RBridge identifier (or ingress RBridge nickname) and an egress RBridge identifier (or egress RBridge nickname). Each of the ingress RBridge identifier and the egress RBridge identifier can be an identifier for one of the flow distribution RBridges in the TRILL network. Before forwarding the traffic, the ingress RBridge can determine an egress RBridge and encapsulate the received traffic with a new ingress RBridge identifier (e.g., its own RBridge identifier) and an egress RBridge identifier (e.g., the identifier of the selected egress RBridge). The outer header can optionally include other information such as a hop count, for example. At each subsequent hop, a decapsulating RBridge can remove the outer header, determine an egress RBridge and encapsulate the received traffic with an ingress RBridge identifier (e.g., its own RBridge identifier) and an egress RBridge identifier (e.g., the identifier of the selected egress RBridge). It should be understood that flow distribution RBridges can be configured to perform the above functions.

Flow distribution RBridges can also be configured to perform functions in addition to the functions conventionally performed by RBridges. For example, in a decapsulating flow distribution RBridge, if the egress RBridge identifier falls within the range of {FD_BASE_<Hash Value>, FD_CLUSTER_<Cluster ID>_<Hash Value>}, the flow distribution RBridge can be configured to perform the functions below.

1. Learn a predetermined flow tuple for the reverse flow with the ingress RBridge. It should be understood that predetermined flow tuple can be a 5-tuple (e.g., 5-tuple of Layer 2 Source address, Layer 2 Destination address, Layer 3 protocol type, Layer 3 source address and Layer 3 destination address). However, it should also be understood that this disclosure contemplates using other flow tuples including information such as, but not limited to, protocols and ports, for example.

2. if (Forward Flow is a hit in a flow-state table), then {forward the traffic to the corresponding RBridge using the flow-state table}.
   else if (egress RBridge identifier==FD_BASE_<Hash Value>), then {perform regular RBridge forwarding.} For example, the packet can be forwarded based on at least a portion of the inner header such as the destination address (e.g., a destination MAC address). It should be understood that forwarding based on the destination MAC address is a conventional forwarding technique of an RBridge.
   else if (egress RBridge identifier==FD_CLUSTER_<Cluster ID>_<Hash Value>), then {use <Cluster ID> and <Hash Value> to select a service node using a service cluster load balancing structure LB_SERVICES_<Cluster ID>}. Service cluster load balancing structures LB_SERVICES_<Cluster ID> are built and maintained using the services TLVs discussed in detail above.

Flow-state information can be maintained in a flow-state table, for example. Flow distribution RBridges can be configured to copy flow-state information between RBridges. For example, flow-state information can be copied between flow distribution RBridges when hash values are re-assigned, which is discussed above. The designated flow distribution RBridge can notify affected flow distribution RBridges when hash values are re-assigned so that flow-state information can be copied between flow distribution RBridges as needed. Additionally, for each hash value, the designated flow distribution RBridge designates a primary flow distribution RBridge (i.e., FD_BASE_<Hash Value>) and a backup flow distribution RBridge (i.e., BACKUP_FD_BASE_<Hash Value>). Flow-state information can be copied or duplicated between the primary and backup flow distribution RBridges to minimize disruption when a flow distribution RBridge goes down. Because the flow-state information is duplicated, the expected downtime is expected to be on the order of IS-IS convergence. In addition to flow copying, flow distribution RBridges can be configured to perform flow cleanup. For example, when a service node tears down a connection, the service node can send a message to the corresponding flow distribution RBridges based on hash values for forward and reverse flows. The corresponding flow distribution RBridges can then delete affected flow-state information. It should be understood that flow cleanup can be achieved through extensions to End-Station Address Distribution Information (ESADI) or other protocols for maintaining flow information. Alternatively or additionally, natural flow aging can be implemented in flow distribution RBridges to remove stale flow-state information.

Example Forward Flow

An example forward traffic flow (e.g., between the client 102 and the server 104) is discussed below. For example, a packet, which can be encapsulated with an inner header including source and destination addresses of a flow (e.g., source and destination MAC addresses), is received at client-facing RBridge 120A. Client-facing RBridge 120A can be configured to perform source learning on the source address of the client 102, for example. Client-facing RBridge 120A can then determine which one of the N service clusters handles traffic addressed from the client 102 using its ACL, for example. It should be understood that this determination can be based on the source address of the client 102, client VLAN, etc. For example, client-facing RBridge 120A can determine that traffic from the client 102 is serviced by Cluster 1 (e.g., Cluster ID=1). If client-facing RBridge 120A receives traffic not matching its ACL, client-facing RBridge 120A can be configured to perform regular RBridge forwarding. For example, the packet can be forwarded based on at least a portion of the inner header such as the destination address (e.g., a destination MAC address).

Then, client-facing RBridge 120A can use flow distribution load balancing structure LB_FD_CLUSTER_<Cluster ID>, e.g., LB_FD_CLUSTER_1 to select a flow distribution RBridge for Cluster 1. For example, client-facing RBridge 120A can apply a hash function to the predetermined flow tuple (e.g., any predetermined combination of fields) to obtain a hash value. For example, the hash function can return Hash Value=1. Therefore, client-facing RBridge 120A can select FD_CLUSTER_<Cluster ID>_<Hash Value>, e.g., FD_CLUSTER_1_1, which is a virtual identifier (or nickname) of one of the flow distribution RBridges for Cluster 1 such as flow distribution RBridge 120C, for example. FD_CLUSTER_1_1 can be a virtual RBridge identifier for flow distribution RBridge 120C, for example. Client-facing RBridge 120A can then encapsulate the traffic with an outer header including an ingress RBridge identifier (e.g., the RBridge identifier of client-facing RBridge 120A) and an egress RBridge identifier (e.g., FD_CLUSTER_1_1) and forward the traffic to the next hop.

As discussed above, because the egress RBridge identifier falls within the range of {FD_BASE_<Hash Value>, FD_CLUSTER_<Cluster ID>_<Hash Value>}, when the traffic is received at flow distribution RBridge 120C, flow distribution RBridge 120C can learn the predetermined flow tuple for the reverse flow with the ingress RBridge (e.g., client-facing RBridge 120A) instead of performing a source learn on the source address unlike a regular TRILL RBridge functionality. Additionally, flow distribution RBridge 120C can be configured to perform the functions of a flow distribution RBridge. For example, for existing flows, flow distribution RBridge 120C can redirect traffic based on its flow-state table. For new flows, flow distribution RBridge 120C can determine whether the egress RBridge identifier is a virtual cluster identifier (e.g., FD_CLUSTER_<Cluster ID>_<Hash Value>) or a virtual base identifier (e.g., FD_BASE_<Hash Value>). If the egress RBridge identifier is a virtual cluster identifier, flow distribution RBridge 120C can apply a hash function to the predetermined flow tuple to obtain a hash value. For example, the hash function can return Hash Value=1. Flow distribution RBridge 120C can then select one of the service nodes in Cluster 1 using service cluster load balancing structure LB_SERVICES_<Cluster ID>, e.g., LB_SERVICES_1 for Cluster 1. Using Hash Value=1, flow distribution RBridge 120C can select a service node. For example, flow distribution RBridge 120C can select service node 130A.

Server traffic flow functionality is discussed in detail below. In this example, service node 130A is not part of a service chain and the hash function returns Hash Value=2. Thus, service node 130A selects flow distribution RBridge FD_BASE_2 using flow distribution load balancing structure LB_FD_BASE. Flow distribution RBridge FD_BASE_2 is a virtual identifier (or nickname) of one of the flow distribution RBridges such as flow distribution RBridge 120D, for example. Additionally, service node 130A can also encapsulate the traffic with a new outer header including an ingress RBridge identifier (e.g., the RBridge identifier of service node 130A) and an egress RBridge identifier (e.g., FD_BASE_2) and forward the traffic to the next hop. As discussed above, a packet-forwarding device to which a service node is attached can act as a proxy for the service node and perform the above functions if the service node lacks the above capabilities.

Alternatively, if the egress RBridge identifier is a virtual base identifier, flow distribution RBridge 120C can be configured to perform regular RBridge forwarding. For example, the packet can be forwarded based on at least a portion of the inner header such as the destination address (e.g., a destination MAC address). It should be understood that forwarding based on the destination MAC address is a conventional forwarding technique of an RBridge. This function is discussed in detail below. Additionally, flow distribution RBridge 120C can decapsulate the outer header from the received traffic. Flow distribution RBridge 120C can also encapsulate the traffic with a new outer header including an ingress RBridge identifier (e.g., the RBridge identifier of flow distribution RBridge 120C) and an egress RBridge identifier (e.g., RBridge identifier for service node 130A) and forward the traffic to the next hop.

When the traffic is received at service node 130A, service node 130A can be configured to decapsulate the outer header from the traffic and perform the service functions (e.g., additional packet manipulations) for encryption, decryption, firewall, load balancing, intrusion detection, accounting, etc. It should be understood that the traffic received by the service node 130A is the original traffic that enters the client-facing RBridge 120A with an additional client VLAN tag (e.g., inner dot1q header). After performing the service functions, service node 130A can be configured to choose the next service node in a service chain, for example, using service cluster load balancing structure LB_SERVICES_<Cluster ID>, or if there is no service chain, choose a flow distribution RBridge using flow distribution load balancing structure LB_FD_BASE. Service node 130A can apply a hash function to the predetermined flow tuple to obtain a hash value, for example. If service node 130 is not the last service node in the service chain and the next service node in the service chain is a cluster of service nodes, service node 130A uses the hash value to choose one of the service nodes of the service cluster as the next service node in the service chain. If service node 130A is the last service node in the service chain, service node 130A chooses one of the flow distribution RBridges based on the hash value of the predetermined flow tuple.

Because the egress RBridge identifier falls within the range of {FD_BASE_<Hash Value>, FD_CLUSTER_<Cluster ID>_<Hash Value>}, when the traffic is received at flow distribution RBridge 120D, flow distribution RBridge 120D can learn the predetermined flow tuple for the reverse flow with the ingress RBridge (e.g., service node 130A) instead of performing a source learn on the source address unlike a regular TRILL RBridge functionality. For existing flows, flow distribution RBridge 120D can redirect traffic based on its flow-state table. For new flows, flow distribution RBridge 120D can determine whether the egress RBridge identifier is a virtual cluster identifier (e.g., FD_CLUSTER_<Cluster ID>_<Hash Value>) or a virtual base identifier (e.g., FD_BASE_<Hash Value>). In this example, the egress RBridge identifier is a virtual base identifier (e.g., FD_BASE_2), so flow distribution RBridge 120D can be configured to perform regular RBridge forwarding. For example, the packet can be forwarded based on at least a portion of the inner header such as the destination address (e.g., a destination MAC address). It should be understood that forwarding based on the destination MAC address is a conventional forwarding technique of an RBridge. For example, flow distribution RBridge 120D can select server-facing RBridge 120B, for example. Additionally, flow distribution RBridge 120D can decapsulate the outer header from the received traffic. Flow distribution RBridge 120D can also encapsulate the traffic with a new outer header including an ingress RBridge identifier (e.g., FD_BASE_2) and an egress RBridge identifier (e.g., RBridge identifier for server-facing RBridge 120B) and forward the traffic to the next hop.

When the traffic is received at server-facing RBridge 120B, flow distribution RBridge 120B can decapsulate the outer header from the received traffic. Additionally, flow distribution RBridge 120B can be configured to perform regular RBridge forwarding. For example, the packet can be forwarded based on at least a portion of the inner header such as the destination address (e.g., a destination MAC address). It should be understood that forwarding based on the destination MAC address is a conventional forwarding technique of an RBridge. For example, server-facing RBridge 120B can forward the traffic to the server 104 based on the destination address.

Example Reverse Flow

An example reverse traffic flow (e.g., between the server 104 and the client 102) is discussed below. For example, a packet, which can be encapsulated with an inner header including source and destination addresses (e.g., source and destination MAC addresses), is received at server-facing RBridge 120B. As discussed above, server-facing RBridge 120B can be configured to use flow distribution load balancing structure LB_FD_BASE to select a flow distribution RBridge when traffic is received on one of its interfaces. Server-facing RBridge 120B can apply a hash function to the predetermined flow tuple to obtain a hash value. It should be understood that the hash function will return the same hash values for the forward and reverse flows, e.g., Hash Value=2, the same as the hash value returned for traffic flowing between the service node 130A and the server 104. Server-facing RBridge 120B selects flow distribution RBridge FD_BASE_2, which is a virtual identifier (or nickname) of one of the flow distribution RBridges such as flow distribution RBridge 120D, for example. Additionally, server-facing RBridge 120B can decapsulate the outer header from the received traffic. Server-facing RBridge 120B can also encapsulate the traffic with a new outer header including an ingress RBridge identifier (e.g., the RBridge identifier for server-facing RBridge 120B) and an egress RBridge identifier (e.g., FD_BASE_2) and forward the traffic to the next hop.

When the traffic is received at flow distribution RBridge FD_BASE_2, e.g., flow distribution RBridge 120D, and because the egress RBridge identifier falls within the range of {FD_BASE_<Hash Value>, FD_CLUSTER_<Cluster ID>_<Hash Value>}, when the traffic is received at flow distribution RBridge 120D, flow distribution RBridge 120D can learn the predetermined flow tuple for the reverse flow with the ingress RBridge (e.g., server-facing RBridge 120B) instead of performing a source learn on the source address unlike a regular TRILL RBridge functionality. Additionally, flow distribution RBridge 120D is configured to recognize that this is an existing flow by matching the forward and reverse flows using its flow-state table. Flow distribution RBridge 120D can use its flow-state table to redirect the traffic to service node 130A, for example. Additionally, flow distribution RBridge 120D can decapsulate the outer header from the received traffic. Flow distribution RBridge 120D can also encapsulate the traffic with a new outer header including an ingress RBridge identifier (e.g., FD_BASE_2) and an egress RBridge identifier (e.g., RBridge identifier for service node 130A) and forward the traffic to the next hop.

When the traffic is received at service node 130A, service node 130A can be configured to decapsulate the outer header from the traffic and perform the service node functions (e.g., additional packet manipulations) for encryption, decryption, firewall, load balancing, intrusion detection, accounting, etc. After performing the service functions, service node 130A can be configured to choose the next service node in a service chain, for example, using service cluster load balancing structure LB_SERVICES_<Cluster ID>, or if there is no service chain, choose a flow distribution RBridge using flow distribution load balancing structure LB_FD_BASE. Service node 130A can apply a hash function to the predetermined flow tuple to obtain a hash value, for example. Server traffic flow functionality is discussed in detail below. In this example, service node 130A is not part of a service chain and the hash function returns Hash Value=1. It should be understood that the hash function will return the same hash values for the forward and reverse flows, e.g., Hash Value=1, the same as the hash value returned for traffic flowing between the client 102 and service node 130A. Thus, service node 130A selects flow distribution RBridge FD_BASE_1 using flow distribution load balancing structure LB_FD_BASE. Flow distribution RBridge FD_BASE_1 is a virtual identifier (or nickname) of one of the flow distribution RBridges such as flow distribution RBridge 120C, for example. Additionally, service node 130A can also encapsulate the traffic with a new outer header including an ingress RBridge identifier (e.g., the RBridge identifier of service node 130A) and an egress RBridge identifier (e.g., FD_BASE_1) and forward the traffic to the next hop. As discussed above, a packet-forwarding device to which a service node is attached can act as a proxy for the service node and perform the above functions if the service node lacks the above capabilities.

When the traffic is received at flow distribution RBridge FD_BASE_1, e.g., flow distribution RBridge 120C, and because the egress RBridge identifier falls within the range of {FD_BASE_<Hash Value>, FD_CLUSTER_<Cluster ID>_<Hash Value>}, when the traffic is received at flow distribution RBridge 120C, flow distribution RBridge 120C can learn the predetermined flow tuple for the reverse flow with the ingress RBridge (e.g., service node 130A) instead of performing a source learn on the source address unlike a regular TRILL RBridge functionality. Additionally, flow distribution RBridge 120C is configured to recognize that this is an existing flow by matching the forward and reverse flows using its flow-state table. Flow distribution RBridge 120C can use its flow-state table to redirect the traffic to client-facing RBridge 120A, for example. Additionally, flow distribution RBridge 120C can decapsulate the outer header from the received traffic. Flow distribution RBridge 120C can also encapsulate the traffic with a new outer header including an ingress RBridge identifier (e.g., FD_BASE_1) and an egress RBridge identifier (e.g., RBridge identifier for client-facing RBridge 120A) and forward the traffic to the next hop.

When the traffic is received at client-facing RBridge 120A, client-facing RBridge 120A can decapsulate the outer header from the received traffic. Additionally, client-facing RBridge 120A can be configured to perform regular RBridge forwarding. For example, the packet can be forwarded based on at least a portion of the inner header such as the destination address (e.g., a destination MAC address). It should be understood that forwarding based on the destination MAC address is a conventional forwarding technique of an RBridge. For example, client-facing RBridge 120A can forward the traffic to the client 102 based on the destination address.

Service Chaining Functionality

Service nodes (e.g., service nodes 130A-130E) can be configured to send services TLVs, which can be used when forming consistent cluster information (e.g., service cluster load balancing structures) throughout the TRILL network 110 without requiring an additional control plane and data plane in the TRILL network 110, as discussed above. Service cluster load balancing structures LB_SERVICES_<Cluster ID> can be formed for each cluster. After performing a service (e.g., decryption, firewall, load balancing, intrusion detection, accounting, etc.), service nodes can be configured to perform the following functions.

If service node is part of a service chain, then select the next service node in the service chain using a service cluster load balancing structure LB_SERVICES_<Cluster ID> based on the hash value.

Else (e.g., service node is not part of a service chain), select a flow distribution RBridge using a flow distribution load balancing structure LB_FD_BASE based on the hash value.

As discussed above, service nodes can apply a hash function to the predetermined flow tuple to obtain a hash value. Additionally, as discussed above, a packet-forwarding device to which a service node is attached can act as a proxy for the service node and perform the above functions if the service node lacks the above capabilities.

Examples where the service node is not part of a service chain are provided above with regard to the example forward and reverse flows. For example, service node selects a flow distribution RBridge using a flow distribution load balancing structure LB_FD_BASE when service node is not part of a service chain. Additionally, the last service node in a service chain also selects a flow distribution RBridge using a flow distribution load balancing structure LB_FD_BASE. When service node is part of a service chain, service node selects the next service node in the service chain using a service cluster load balancing structure LB_SERVICES_<Cluster ID>. For example, service chaining functionality can be implemented by maintaining a linked list of service cluster load balancing structures LB_SERVICES_<Cluster ID>, with each service cluster load balancing structure pointing to one or more service nodes of the same service type, with the linked list being formed through different service types in the service chain. Flow distribution RBridges can maintain service cluster load balancing structures LB_SERVICES_<Cluster ID> pointing to service nodes of a first type, the service nodes of the first type can maintain service cluster load balancing structures LB_SERVICES_<Cluster ID> pointing to service nodes of a second type, etc.

For example, a service cluster including service nodes 130A-130E is shown in FIG. 1. The service cluster has a Cluster ID=1, for example. It should be understood that this disclosure contemplates a TRILL network including more than one service cluster. In an example implementation, firewall and load balancing services are to be performed in sequence (i.e., firewall services and then load balancing services). Additionally, service nodes 130A-130C can be configured to host firewall services, and service nodes 130D-130E can be configured to host load balancing services. Accordingly, flow distribution RBridges can maintain service cluster load balancing structures LB_SERVICES_1 pointing to service nodes 130A-130C (hosting firewall services), service nodes 130A-130C can maintain service cluster load balancing structures LB_SERVICES_1 pointing to service nodes 130D-130E (hosting load balancing services) and service nodes 130D-130E can maintain service cluster load balancing structures LB_SERVICES_1 pointing to NULL. In the example implementation, a flow distribution RBridge can select a service node of the first type (e.g., firewall) using the hash value from service cluster load balancing structures LB_SERVICES_1 pointing to service nodes 130A-130C. Additionally, service nodes 130A-130C can select a next service node of the second type (e.g., load balancing) using the hash value from service cluster load balancing structures LB_SERVICES_1 pointing to service nodes 130D-130E. Service nodes 130D-130E (e.g., the last service node in the chain) can select a flow distribution RBridge using the hash value from LB_FD_BASE.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 2:
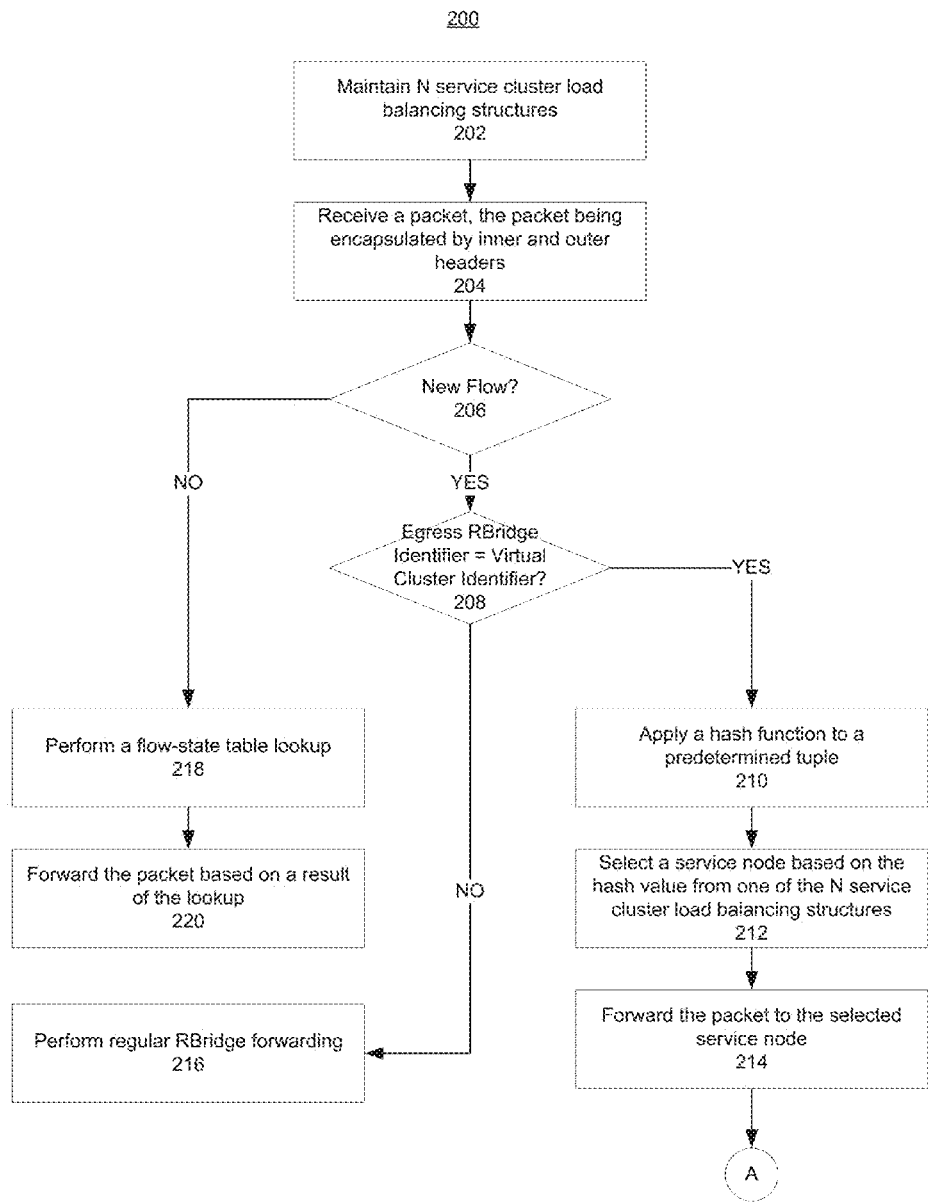
FIG. 2 is a flow diagram illustrating example operations for implementing service clustering.

Referring now to FIG. 2, a flow diagram illustrating example operations 200 for implementing service clustering is shown. As discussed above, the example operations 200 can be implemented in the example network environment 100 of FIG. 1. The example operations 200 can be performed by a flow distribution RBridge, for example. At 202, N service cluster load balancing structures can be maintained, where N is a number of service clusters and N≥1. At 204, a packet can be received at the flow distribution RBridge. The packet can be encapsulated with an inner header and an outer header. The inner header can include a source address and a destination address of a flow, and the outer header can include an ingress RBridge identifier and an egress RBridge identifier.

At 206, a determination can be made as to whether the packet is part of an existing flow. For new traffic flows, at 208, a determination can be made as to whether the egress RBridge identifier of the received packet is a virtual cluster identifier or a virtual base identifier. At 210, if the egress RBridge identifier is a virtual cluster identifier, a hash function can be applied to a predetermined flow tuple to obtain a hash value. At 212, a service node associated with the hash value can be selected from one of the N service cluster load balancing structures (e.g., LB_SERVICES_<Cluster ID>). At 214, the packet can be forwarded to the selected service node. The operations then proceed to FIG. 3, which illustrates example operations 300 for implementing service chaining, and are discussed in detail below.

At 216, if the egress RBridge identifier is a virtual base identifier, regular RBridge forwarding can be performed. For example, the packet can be forwarded based on at least a portion of the inner header such as the destination address (e.g., destination MAC), for example. Additionally, for existing flows, at 218, a flow-state table lookup is performed. As discussed above, a flow distribution RBridge can maintain flow-state information in the flow-state table. At 220, the packet, which is part of an existing flow, can be forwarded based on a result of the lookup so that packets associated with forward and reverse flows are handled by the same service node.

Figure 3:
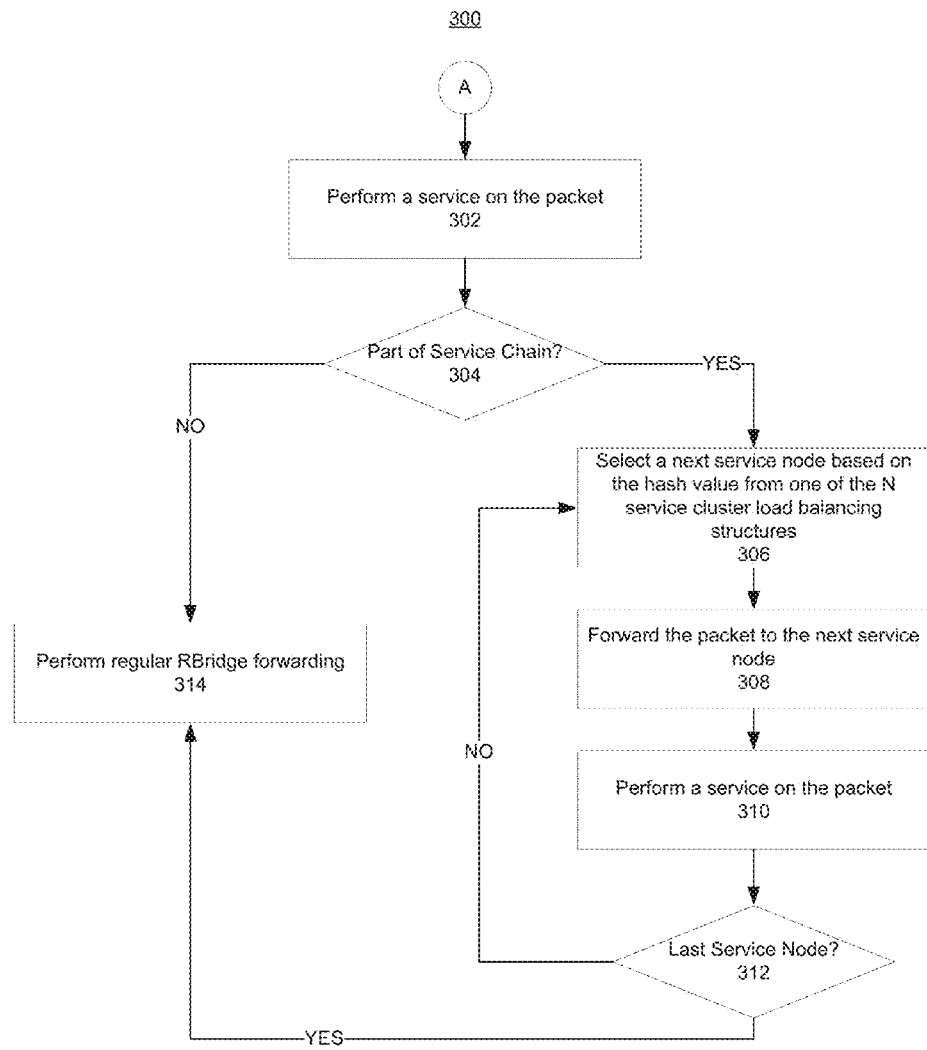
FIG. 3 is a flow diagram illustrating example operations for implementing service chaining.

Referring now to FIG. 3, at 302, a service is performed on the packet. Services include, but are not limited to, encryption, decryption, firewall, load balancing, intrusion detection, accounting, etc. At 304, a determination is made as to whether the service node is part of a service chain. If YES, at 306, the next service node in the service chain is selected based on the hash value from one of the N service cluster load balancing structures (e.g., LB_SERVICES_<Cluster ID>). At 308, the packet can be forwarded to the next service node, and at 310, a service can be performed on the packet. At 312, a determination can be made as to whether the service node is the last service node in the service chain (i.e., a NULL value in LB_SERVICES_<Cluster ID>). If YES, at 314, regular RBridge forwarding can be performed. For example, the packet can be forwarded based on at least a portion of the inner header such as the destination address (e.g., destination MAC), for example. Additionally, for service nodes not part of a service chain, operations can proceed to 314 where regular RBridge forwarding is performed.

Figure 4:
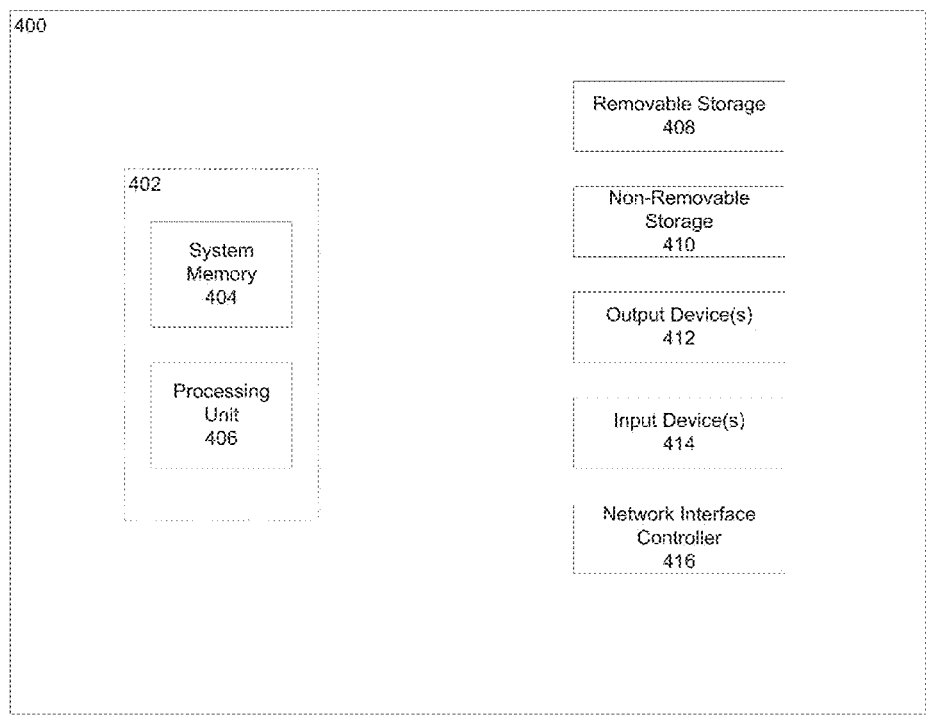
FIG. 4 is a block diagram of an example computing device.

When the logical operations described herein are implemented in software, the process may execute on any type of computing architecture or platform. For example, referring to FIG. 4, an example computing device upon which embodiments of the invention may be implemented is illustrated. In particular, the client device, server, RBridges and service nodes discussed above may be a computing device, such as computing device 400 shown in FIG. 4. The computing device 400 may include a bus or other communication mechanism for communicating information among various components of the computing device 400. In its most basic configuration, computing device 400 typically includes at least one processing unit 406 and system memory 404. Depending on the exact configuration and type of computing device, system memory 404 may be volatile (such as random access memory (RAM)), non-volatile (such as read-only memory (ROM), flash memory, etc.), or some combination of the two. This most basic configuration is illustrated in FIG. 4 by dashed line 402. The processing unit 406 may be a standard programmable processor that performs arithmetic and logic operations necessary for operation of the computing device 400.

Computing device 400 may have additional features/functionality. For example, computing device 400 may include additional storage such as removable storage 408 and non-removable storage 410 including, but not limited to, magnetic or optical disks or tapes. Computing device 400 may also contain network connection(s) 416 that allow the device to communicate with other devices. Computing device 400 may also have input device(s) 414 such as a keyboard, mouse, touch screen, etc. Output device(s) 412 such as a display, speakers, printer, etc. may also be included. The additional devices may be connected to the bus in order to facilitate communication of data among the components of the computing device 400. All these devices are well known in the art and need not be discussed at length here.

The processing unit 406 may be configured to execute program code encoded in tangible, computer-readable media. Computer-readable media refers to any media that is capable of providing data that causes the computing device 400 (i.e., a machine) to operate in a particular fashion. Various computer-readable media may be utilized to provide instructions to the processing unit 406 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 406 may execute program code stored in the system memory 404. For example, the bus may carry data to the system memory 404, from which the processing unit 406 receives and executes instructions. The data received by the system memory 404 may optionally be stored on the removable storage 408 or the non-removable storage 410 before or after execution by the processing unit 406.

Computing device 400 typically includes a variety of computer-readable media. Computer-readable media can be any available media that can be accessed by device 400 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

The methods and devices for providing service insertion and clustering discussed herein provide a number of advantages. First, the methods and devices leverage the natural properties of the TRILL protocol and IS-IS control plane for providing service insertion, redirection and clustering in a TRILL network. No additional control plane for providing these function is required. Further, service chaining functionality can be provided in the regular data path through use of encapsulation and ACL redirect functionality. Additionally, the methods and devices provide flexibility for inserting and clustering flow distribution RBridges and service nodes anywhere in a TRILL network. For example, in traditional implementations, flow distributors should be placed in the path of the traffic, which can be difficult when multiple entry and exit points rely on the services of the flow distributors, and scaling the capacity through clustering flow distributor resources is not achievable. Similarly, service node clustering in traditional implementations is typically provided with a logical port channel to an attached packet-forwarding device. Whereas according to implementations discussed herein, clustering can be achieved across nodes that need not be directly attached and can be present anywhere in the TRILL network. In addition, the methods and devices discussed herein can be implemented by regular RBridges in a TRILL network, which reduces the number of hops and bandwidth. Also, convergence upon failure of a network node is on the order of IS-IS ISIS convergence, which is much faster than a services control plane.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing service insertion in a Transparent Interconnect of Lots of Links (TRILL) network, the method comprising:
   maintaining a service node in a TRILL network, the service node performing steps comprising:
      receiving a packet from an RBridge;
      decapsulating an outer header from the packet, the outer header including an ingress RBridge identifier and an egress RBridge identifier for the TRILL network;
      performing one or more service functions on the packet;
      determining if there is a next service node in a service chain where the packet should be forwarded for further service functions;
         if there is a next service node in the service chain, forwarding the packet to the next service node;
         if there is no next service node in the service chain, encapsulating the packet with a new outer header including an ingress RBridge identifier and an egress RBridge identifier and forwarding the packet to a next hop in the TRILL network;
      determining whether the egress RBridge identifier is a virtual cluster identifier or a virtual base identifier;
         if the egress RBridge identifier is a virtual cluster identifier, applying a hash function to a predetermined flow tuple to obtain a hash value, selecting a service node associated with the hash value, and forwarding the packet to the selected service node; and
         if the egress RBridge identifier is a virtual base identifier, forwarding the packet based on at least a portion of the inner header.

2. The method of claim 1, wherein the RBridge is a client-facing RBridge.

3. The method of claim 1, wherein the service node further performs steps comprising:
   maintaining flow-state information in a flow-state table;
   learning the predetermined flow tuple for a reverse flow;
   determining whether the packet is part of an existing flow;
   if the packet is part of an existing flow, performing a lookup in the flow-state table to obtain a next hop and forwarding the packet based on a result of the lookup; and
   if the packet is not part of an existing flow, determining whether the egress RBridge identifier is a virtual cluster identifier or a virtual base identifier.

4. The method of claim 1, wherein the service node further performs steps comprising:
   transmitting a services Type Length Value (TLV), the services TLV comprising at least one of a service cluster identifier, a service type, a service load metric and a service sequence number; and
   updating one or more service cluster load balancing structures based on the services TLV.

5. The method of claim 4, wherein the services TLV is an Intermediate System-to-Intermediate System (IS-IS) TLV.

6. The method of claim 1, further comprising maintaining a plurality of flow distribution load balancing structures in a flow distribution RBridge.

7. The method of claim 6, further comprising:
transmitting or receiving a flow distribution Type Length Value (TLV), the flow distribution TLV comprising a hash function and a plurality of hash values, a flow distribution base RBridge associated with each of the hash values and a flow distribution RBridge associated with each combination of cluster identifier and hash value; and
updating one or more of the plurality of flow distribution load balancing structures based on the flow distribution TLV.

8. The method of claim 7, wherein the flow distribution TLV is an Intermediate System-to-Intermediate System (IS-IS) TLV.

9. A non-transitory computer readable medium for providing service clustering in a Transparent Interconnect of Lots of Links (TRILL) network, the TRILL network comprising one or more flow distribution RBridges for distributing flows to a plurality of service nodes, the non-transitory computer readable medium having computer-executable instructions stored thereon that, when executed by a flow distribution RBridge, cause the flow distribution RBridge to:
maintain one or more service cluster load balancing structures;
receive a packet, the packet being encapsulated with an inner header and an outer header, the inner header including a source address and a destination address of a flow, and the outer header including an ingress RBridge identifier for one of the flow distribution RBridges in the TRILL network and an egress RBridge identifier for one of the flow distribution RBridges in the TRILL network;
determine whether the egress RBridge identifier is a virtual cluster identifier or a virtual base identifier;
if the egress RBridge identifier is a virtual cluster identifier, apply a hash function to a predetermined flow tuple to obtain a hash value and select a service node associated with the hash value from one of the one or more service cluster load balancing structures; and
forward the packet to the selected service node; and
if the egress RBridge identifier is a virtual base identifier, the non-transitory computer readable medium having further computer-executable instructions stored thereon that, when executed by the flow distribution RBridge, cause the flow distribution RBridge to forward the packet based on at least a portion of the inner header.

10. The non-transitory computer readable medium of claim 9, having further computer-executable instructions stored thereon that, when executed by the flow distribution RBridge, cause the flow distribution RBridge to:
maintain flow-state information in a flow-state table;
learn the predetermined flow tuple for a reverse flow;
determine whether the packet is part of an existing flow;
if the packet is part of an existing flow, perform a lookup in the flow-state table to obtain a next hop and forwarding the packet based on a result of the lookup; and
if the packet is not part of an existing flow, determine whether the egress RBridge identifier is a virtual cluster identifier or a virtual base identifier.

11. The non-transitory computer readable medium of claim 9, the non-transitory computer readable medium having further computer-executable instructions stored thereon that, when executed by the flow distribution RBridge, cause the flow distribution RBridge to:
receive a services Type Length Value (TLV), the services TLV comprising at least one of a service cluster identifier, a service type, a service load metric and a service sequence number; and
update one or more of the N service cluster load balancing structures based on the services TLV.

12. The non-transitory computer readable medium of claim 11 wherein the services TLV is an Intermediate System-to-Intermediate System (IS-IS) TLV.

13. The non-transitory computer readable medium of claim 9, having further computer-executable instructions stored thereon that, when executed by the flow distribution RBridge, cause the flow distribution RBridge to maintain a plurality of flow distribution load balancing structures in the flow distribution RBridge.

14. The non-transitory computer readable medium of claim 13, having further computer-executable instructions stored thereon that, when executed by the flow distribution RBridge, cause the flow distribution RBridge to:
transmit or receiving a flow distribution Type Length Value (TLV), the flow distribution TLV comprising the hash function and a plurality of hash values, a flow distribution base RBridge associated with each of the hash values and a flow distribution RBridge associated with each combination of cluster identifier and hash value; and
update one or more of the plurality of flow distribution load balancing structures based on the flow distribution TLV.

15. The non-transitory computer readable medium of claim 14, wherein the flow distribution TLV is an Intermediate System-to-Intermediate System (IS-IS) TLV.

16. An RBridge for providing service clustering in a Transparent Interconnect of Lots of Links (TRILL) network, the RBridge comprising:
a processor; and
a memory operably coupled to the processor, the memory having computer-executable instructions stored thereon that, when executed by the processor, cause the RBridge to:
maintain service cluster load balancing structures;
receive a packet, the packet being encapsulated with an inner header and an outer header, the inner header including a source address and a destination address of a flow, and the outer header including an ingress RBridge identifier and an egress RBridge identifier;
determine whether the egress RBridge identifier is a virtual cluster identifier or a virtual base identifier;
if the egress RBridge identifier is a virtual cluster identifier, apply a hash function to a predetermined flow tuple to obtain a hash value and select a service node associated with the hash value from one of a group of service cluster load balancing structures; and
forward the packet to the selected service node; and
if the egress RBridge identifier is a virtual base identifier, the memory having further computer-executable instructions stored thereon that, when executed by the processor, cause the RBridge to forward the packet based on at least a portion of the inner header.

* * * * *